United States Patent [19]
Lee

[11] Patent Number: 5,424,520
[45] Date of Patent: Jun. 13, 1995

[54] AUTOMATIC SALES SLIP REGISTER FOR CREDIT CARD

[75] Inventor: Do H. Lee, Chunan, Rep. of Korea

[73] Assignee: Goldstar Electric Machinery Co., Ltd., Seoul, Rep. of Korea

[21] Appl. No.: 185,012

[22] Filed: Jan. 24, 1994

[30] Foreign Application Priority Data

Jan. 26, 1993 [KR] Rep. of Korea ............... 931/1993

[51] Int. Cl.$^6$ ............................................. G06K 5/00
[52] U.S. Cl. .................................................. 235/380
[58] Field of Search ............... 235/380, 432, 448, 379; 400/120, 124; 101/269, 375, 268, 349

[56] References Cited

U.S. PATENT DOCUMENTS

| Re. 34,096 | 10/1992 | Golightly | 235/380 |
|---|---|---|---|
| 3,624,615 | 11/1991 | Lippold | 235/380 |
| 4,523,087 | 6/1985 | Benton | 235/432 X |
| 4,676,676 | 6/1987 | Bitoh | 400/120 |

FOREIGN PATENT DOCUMENTS

| 8602757 | 5/1986 | WIPO | 235/380 |
|---|---|---|---|
| 9103801 | 3/1991 | WIPO | 235/380 |

*Primary Examiner*—Donald Hajec
*Assistant Examiner*—Le Thien Minh
*Attorney, Agent, or Firm*—Oliff & Berridge

[57] ABSTRACT

An automatic sales slip register for credit card. This register imprints embossed characters of a submitted credit card on a sales slip when issuing the sales slip, thus to prevent issue of sales slip when no credit card is submitted. The main body of the register includes a card insert slit, a slant support block supporting a lower end of the credit card inserted in the card insert slit, a stopper preventing the card from sliding off the support block and guiding the card, a plant mounting plate mounted on the slant support block, an imprinting roller for imprinting embossed characters of the card on the sales slip, a roller drive unit for reciprocating the imprinting roller together with a roller support bracket, a printer head for printing other items on their respective blanks of the sales slip after imprinting of the embossed characters on the sales slip, and a sales slip feed sensor mounted on the support block in order for checking a feeding operation of the sales slip.

7 Claims, 5 Drawing Sheets

AUTOMATIC SALES SLIP REGISTER FOR CREDIT CARD

BACKGROUND OF THE INVENTION

1. Field of the Invention

The present invention relates in general to a sales slip register for credit card and, more particularly, to an automatic sales slip register automatically imprinting the embossed characters of a credit card on an imprinting blank of a sales slip when issuing the sales slip.

2. Description of the Prior Art

Recently, credit cards are generally used as the third currency in accordance with development of dealings on credit. The use of credit cards is attended with the use of automatic sales slip registers, which registers automatically issue the sales slips while checking whether the submitted credit cards are available and printing items on the sales slips.

With reference to FIG. 1, there is shown in a perspective view a conventional automatic sales slip register for credit card. The conventional sales slip register comprises a card reader 1 for checking whether a submitted credit card 6 is available. The sales slip register further comprises a main body 3 which is connected to the card reader 1 by a cable 4. The main body 3 automatically prints information, such as date, time, cardholder name and card number, an amount merchant name and the like, on a sales slip by operation of a keyboard 2 when the card reader 1 determines that the submitted credit card 6 is available.

When issuing the sales slip using the above sales slip register, the submitted credit card 6 is inserted into a card insert slit 5 of the card reader 1 and, thereafter, linearly moved in the card insert slit 5. During the linear movement of the submitted credit card 6 in the card insert slit 5 of the card reader 1, the card number recorded in a magnetic recording part (not shown) of the credit card 6 is applied to a host computer (not shown) of a credit card issuer in order to be checked whether the submitted credit card 6 is available. That is, upon reception of the card number, the host computer of the card issuer checks such as whether the card 6 is one, stolen or lost, whether the term of availability of the card 6 has been terminated and whether the used sum of the card 6 has reached its maximum amount. The checking result of the host computer is outputted to the card reader 1 and displayed on a display 7 of the card reader 1, thus to allow the inquirer to easily check availability of the submitted credit card 6.

When it is determined that the submitted credit card 6 is available, the inquirer inputs item information, such as an amount, date and a card number, by operation of the keyboard 2 and the item information is transmitted to the main body 3 through the cable 4. Upon reception of the item information, the main body 3 prints the item information, such as the amount, the date and the card number, on the sales slip 8 prior to issue of the sales slip 8. When the sales slip 8 printed with the item information is issued, the owner of the card 6 signs a signature blank of the sales slip 8, thus to accomplish issue of the sales slip 8.

However, the above sales slip register for credit card has a problem that the embossed characters of a credit card are not imprinted on a sales slip but the item information including information of the card is simply printed on the sales slip by operation of the keyboard and, in this regard, the sales slip may be issued by the register without submission of a credit card. Hence, a bad merchant having a knowledge of card numbers of other peoples' credit cards may commit a crime using his sales slip register. Otherwise stated, the; bad merchant swindles money out of the card owners by issuing sales slips using the sales slip register as he pleases.

SUMMARY OF THE INVENTION

It is, therefore, an object of the present invention to provide an automatic sales slip register for credit card in which the above-mentioned problem of the conventional register can be overcome and which imprints embossed characters of submitted credit cards on sales slips when issuing the sales slips, thus to prevent issue of sales slip when no credit card is submitted.

In order to accomplish the above object, an automatic sales slip register for credit card in accordance with an embodiment of the present invention comprises a card reader for checking whether the credit card is available, a main, body for printing and issuing a sales slip when the credit card is available and a cable for connecting the card reader to the main body, wherein the main body includes: a card insert slit provided at a top center of the main body, the main body receiving the credit card through the card insert slit;, a slant support block supporting a lower end of the credit; card inserted in the card insert slit; a stopper provided at a lower section of the slant support block, the stopper preventing the credit card from sliding off the support block and guiding the credit card such that this credit card is precisely placed on a predetermined position of the support block; a slant mounting plate mounted on the slant support block such that it is spaced apart from the support block at a predetermined interval by, a spacer; imprinting roller means for imprinting embossed characters of the credit card on an imprinting blank of the sales slip, the imprinting roller means being mounted on a bottom of the mounting plate and rotatably supported by a roller support bracket such that it is linearly reciprocated together with the roller support bracket; drive means for reciprocating the imprinting roller means together with the roller support bracket; a printer head for printing other items on their respective blanks of the sales slip after imprinting of the embossed characters on the sales slip; and a sales slip feed sensor mounted on an upper section of the support block in order for checking a feeding operation of the sales slip.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
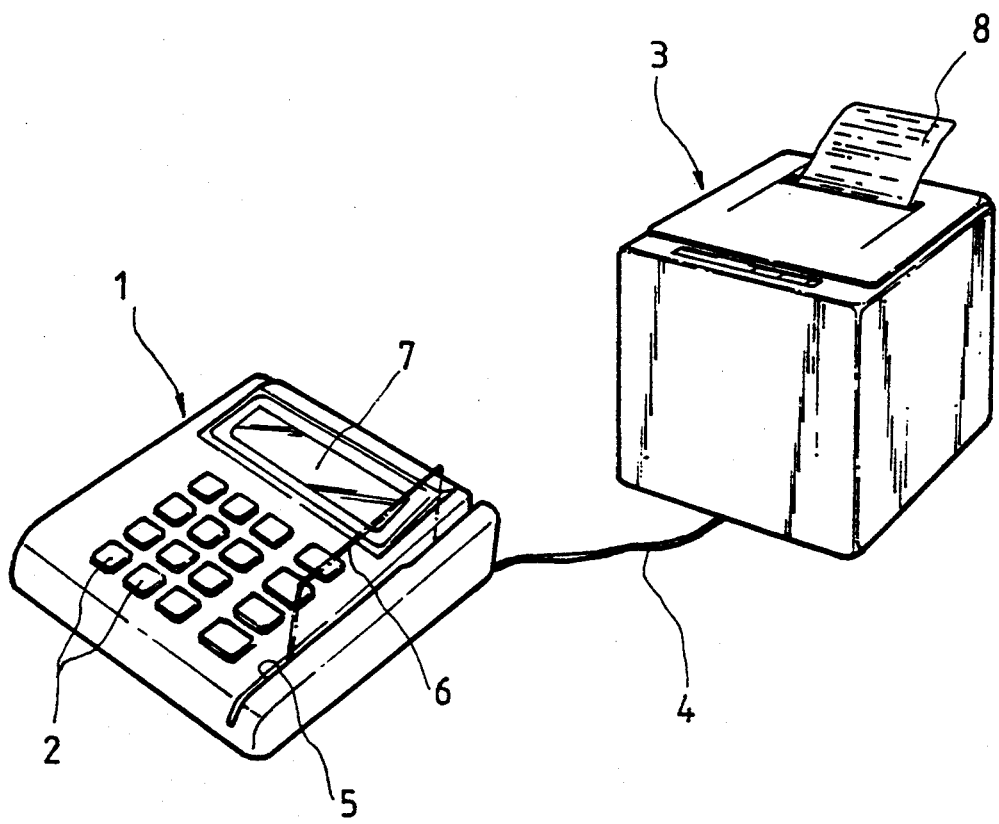
FIG. 1 is a perspective view of a conventional automatic sales slip register for credit card.
Figure 2:
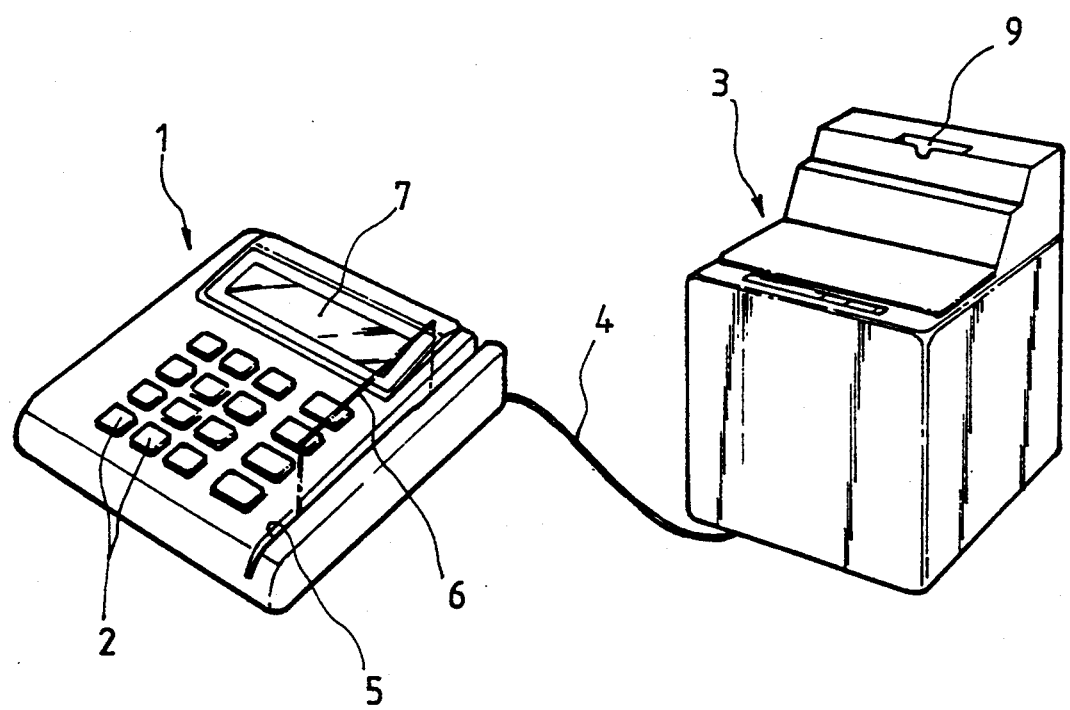
FIG. 2 is a perspective view of an automatic sales slip register for credit card in accordance with a primary embodiment of the present invention.

With reference to FIG. 2, there is shown in a perspective view an automatic sales slip register for credit card in accordance with a primary embodiment of the present invention. This sales slip register includes a card reader 1 which checks whether a submitted credit card 6 is available. The card reader 1 is provided with a display 7 on its upper front section and with a keyboard 2 under the display 7. At the right side of the display 7, the card reader 1 also includes a card insert slit 5 into which is submitted the credit card 6. When the card 6 is inserted into the card insert slit 5, it is linearly moved along the card insert slit 5. During the linear movement of the card 6 along the card insert slit 5, the card reader 1 reads the information recorded in a magnetic recording part of the card 6. The sales slip register of this invention also includes a main body 3 connected to the card reader 1 through a cable 4. This main body 3 has a card insert slit 9 at its top center into which the credit card 8 is inserted. In the main body 3, a slant support block 10 for supporting the credit card 8 inserted in the card insert slit 9 is mounted on a fixing plate 11 by a plurality of set screws 11a as shown in a sectional view of FIG. 4. A stopper 12 is provided at a lower section of the slant support block 10. This stopper 12 prevents the card 8 from sliding off the support block 10 and guides the card 6 such that this card 6 is precisely placed on a predetermined position of the block 10. At an upper section of the slant support block 10, a pair of imprinting rollers 13 are provided. These imprinting rollers 13 are adapted for imprinting embossed characters 6a (see FIG. 6) of the credit card 6 on an imprinting blank of the sales slip 8, The movement of the rollers 13 is caused by drive means described later herein. In accordance with movement of the imprinting rollers 13, the embossed characters 6a of the credit card 6 are imprinted on the imprinting blank of the sales slip 8. When the imprinting of the embossed characters 6a of the card 6 on the imprinting blank of the sales slip 8 is finished, other information 6b (see FIG. 6) is printed in its respective blanks of the sales slip 8 by a printer head 26. A sensor 14 for checking a feeding operation of the sales slip 8 is provided on a top side of the slant support block 10 of the main body 3.

Hereinbelow, the drive means for driving the imprinting rollers 13 will be described in conjunction with FIGS. 3 and 4.

In order to constitute the drive means, a roller support bracket 15 rotatably supporting the pair of imprinting rollers 13 by its spaced roller supporters is movably mounted on the bottom of a mounting plate 17. This mounting plate 17 is mounted on the slant support block 10 such that it is spaced apart from the support block 10 at a predetermined interval corresponding to a height of a spacer 16. A side surface of the roller support bracket 15 is welded to or integrally formed with a rack bar 18. This rack bar 18 is mounted on a guide shaft 19 such that it is stably moved along and guided by the guide shaft 19. The shaft 19 is fixed on the mounting plate 17 such that it is spaced apart from the mounting plate at a predetermined interval.

The rack bar 18 is engaged with a driven spur gear 22 which is in turn engaged with a drive spur gear 21. This drive spur gear 21 cooperates with a drive motor 20, so that the rack bar 18 is linearly moved in accordance with rotation of the drive spur gear 21. The guide shaft 19 is provided with a pair of limit switches 23 on its opposed ends.

The limit switches 23 provided on the opposed ends of the shaft 19 are adapted for controllably driving the drive motor 20 such that the rack bar 18 together with the imprinting rollers 13 is reciprocated along the guide shaft 19, thus to achieve a desired clear imprinting of the embossed characters 6a of the card 6 on the sales slip 8. That is, the rack bar 18 is linearly moved by the driven spur gear 22, so that the limit switches 23 of the guide shaft 19 causes the drive motor 20, which motor 20 generates the rotational force transmitted to the rack bar 18 through the drive and driven spur gears 21 and 22, to be rotated in opposed directions when the rollers 13 imprint the embossed characters 6a of the card 6 on the imprinting blank of the sales slip 8. As a result, the rack bar 18 together with the rollers 13 is reciprocated along the guide shaft 19 and returns to its original position. Since the imprinting rollers 13 are reciprocated as described above when it imprints the embossed characters 6a of the card 6 on the sales slip 8, the desired clear imprinting of the embossed characters 6a of the card 6 on the sales slip 8 is achieved.

Figure 3:
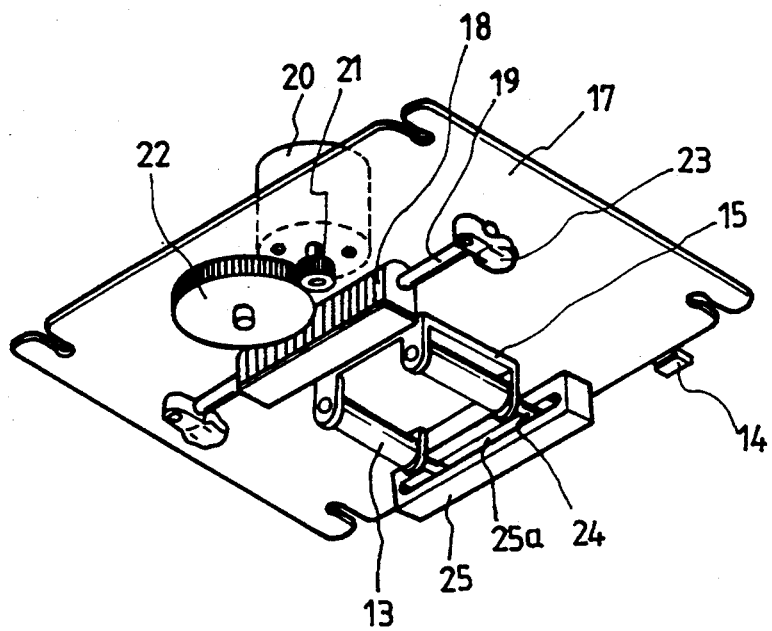
FIG. 3 is an enlarged perspective view of an imprinting section of a main body of the sales slip register of FIG. 2.
Figure 4:
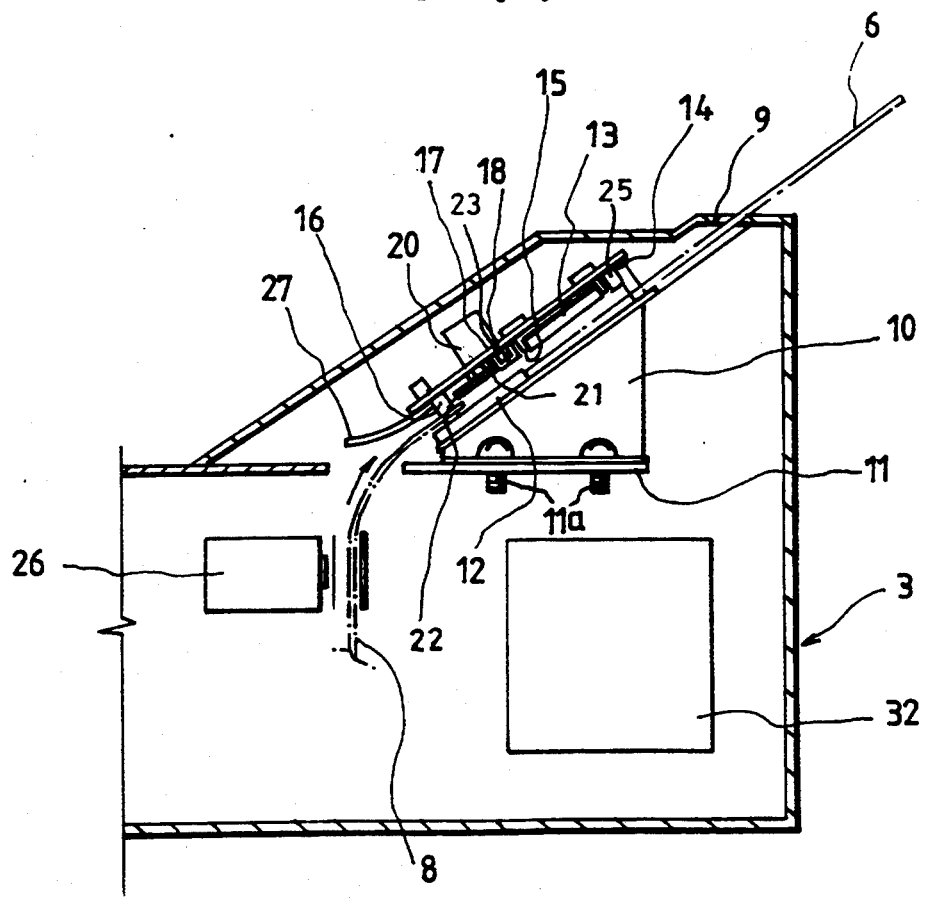
FIG. 4 is a side sectional view of the main body of the sales slip register of the present invention, showing an operation of the register.

As shown in FIG. 3 showing an imprinting section of the main body 3 of the sales slip register of this invention, the imprinting rollers 13 have their respective projections 24, which are integrally formed with shafts of the rollers 13, at the other ends thereof. In addition, a roller guide bracket 25 having a longitudinal slot 25a on its side surface is mounted on the bottom of the mounting plate 17 at a side of the roller support bracket 15. The projections 24 of the rollers 13 are movably inserted in the longitudinal slot 25a of the bracket 25 such that they are stably moved along and guided by the slot 25a during movement of the rollers 13.

In the present invention, it should be understood that one imprinting roller 13 other than the above pair of imprinting rollers 13 may be rotatably mounted on the roller support bracket 15. However, it is preferred to mount the pair of rollers 13 on the roller support bracket 15 such that the rollers 13 are parallel with each other and spaced-out at a predetermined interval as shown in FIG. 3. When the pair of rollers 13 is mounted on the roller support bracket 15, the moving distance of the roller support bracket 15 is preferably reduced to ½ of that required when one roller 13 is mounted on the roller support bracket 15. Hence, the use of two rollers 13 reduces the time for issue of the sales slip 8.

In order to facilitate introduction of the sales slip 8, on which slip 8 the other information, such as date and amount, are printed by the printer head 26 in accordance with operation of the keyboard 2, between the slant support block 10 and the mounting plate 17, a guide plate 27 is fixed on a lower side of the mounting plate 17.

Figure 5A:
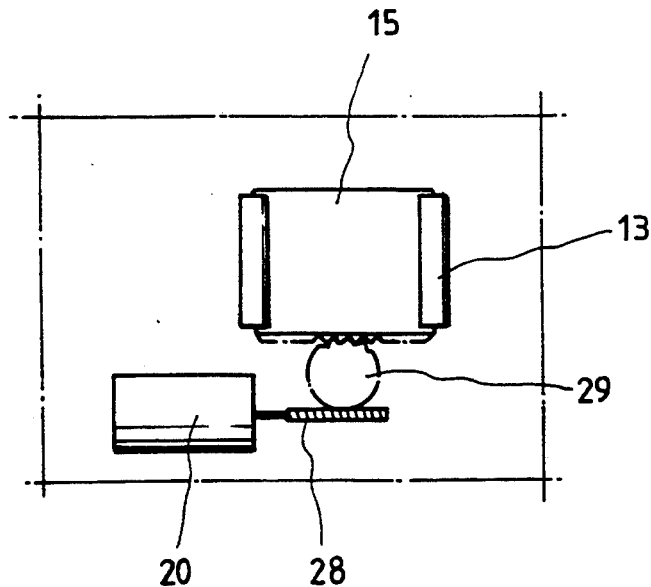
FIGS. 5A and 5B are schematic views of roller drive means in accordance with other embodiments of the present invention, respectively.
Figure 5B:
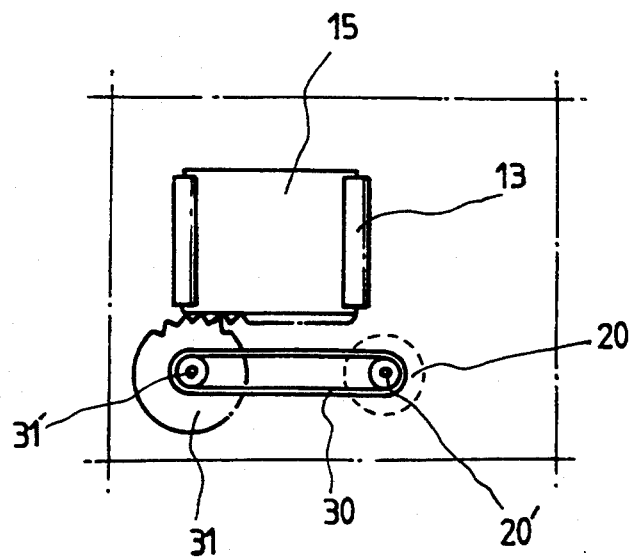

Turning to FIGS. 5A and 5B, there are shown other embodiments of roller drive means of the present invention, respectively. The drive means of FIG. 5A includes a worm 28 and a worm gear 29 instead of the drive spur gear 21 and the drive spur gear 22 of the primary embodiment of FIG. 3, respectively. The worm 28 is directly connected to an output shaft of the drive motor 20 and engaged with the worm gear 29 which is in turn engaged with the rack bar 18. The drive means of FIG. 5B includes a transmission belt 30 and a driven gear 31 instead of the drive spur gear 21 and the driven spur gear 22. In the roller drive means of FIG. 5B, a drive pulley of the drive motor 20 is connected to a driven pulley of the driven gear 31 by the transmission belt 30. The driven gear 31 is in turn engaged with the rack bar 18 in order to linearly move this rack bar 18 together with the imprinting rollers 13 by the rotational force of the drive motor 20. The roller drive means according to either of the other embodiments of FIGS. 5A and 5B yields the same result as that described for the primary embodiment without affecting the functioning of this invention.

In operation of the sales slip register for credit card of the present invention, the submitted credit card 6 is inserted into the card insert slit 5 of the card reader 1 and linearly moved in the card insert slit 5 in order to be checked whether it is available. The checking result is displayed on the display 7 of the card reader 1, thus to allow the inquirer to easily check the availability of the card 6.

When the submitted card 6 is available, the card 6 is inserted into the card insert slit 9 of the top center of the main body 3. As a result, this card 6 is received by the main body 3 such that it is placed on the predetermined position of the slant support block 10. When the card 6 is placed on its position of the support block 10, the stopper 12 provided at the lower section of the support block 10 prevents the card 6 from sliding off the support block 10. This stopper 12 also guides the card 6 when this card 6 is loaded on the support block 10.

Thereafter, keys of the keyboard 2 of the card reader 1 are pushed in order to input information, such as for date and amount, to a CPU 32 of the main body 3. One of the rolled sales slips 8 is unwound and printed with the information by the printer head 26.

The printed sales slip 8 is, thereafter, fed between the support block 10 and the mounting plate 17 in order to be placed on the credit card 6 on the support block 10. When the sales slip 8 is placed on the credit card 6, a sensor 14 provided on the upper section of the support block 10 senses the sales slip 8 and stops feeding of the sales slip 8. At this time, the guide plate 27 mounted at the card input side of the mounting plate 17 makes the sales slip 8 be precisely placed on the credit card 6.

Figure 6:
FIG. 6 is a plan view showing an example of a sales slip issued by the sales slip register of the present invention.

At the same time of precise positioning of the sales slip 8 on the credit card 6, the drive motor 20 starts in order to rotate the drive spur gear 21 and the driven spur gear 22, thus to transmit its rotational force to the rack bar 18. Thus, the rack bar 18 mounted on the guide shaft 19 is linearly moved along the guide shaft 19. The linear movement of the rack bar 18 causes linear movement of the roller support bracket 15 having the imprinting rollers 13, thus to imprint the embossed characters 6a of the credit card 6 on the imprinting blank of the sales slip 8. During the imprinting operation, the pair of limit switches 23, which are provided on opposed ends of the guide shaft 19 and activated by the moving rack bar 18, makes the drive motor 20 be rotated opposed directions, thus to reciprocate the imprinting rollers 13 and to achieve the desired clear imprinting of the embossed characters 6a of the card 6 on the imprinting blank of the sales slip 8. An example of the printed and imprinted sales slip is shown in FIG. 6.

When the imprinting of the embossed characters 6a of the card 6 on the sales slip 8 is finished, the rotation of the drive motor 20 is stopped and, at the same time, the imprinted sales slip 8 is outputted from the main body 3. The owner of the card 6 signs the signature blank of the sales slip 8.

As described above, an automatic sales slip register for credit card in accordance with the present invention not, only prints item information 6b on the sales slip but also imprints embossed characters 6a of a submitted credit card 6 on an imprinting blank of the sales slip 8. In this regard, the sales slip register of this invention cannot issue the sales slip without credit card. Thus, the register of this invention prevents a bad merchant having a knowledge of card numbers of other peoples' credit cards from committing a crime using his sales slip register. Hence, this register prevents the bad merchant from swindling money out of the card owners by issuing sales slips as his pleases.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic sales slip register for a credit card comprising a card reader for checking whether said credit card is available, a main body for printing and issuing a sales slip when said credit card is available and a cable for connecting said card reader to said main body, wherein said main body includes:

a card insert slit provided at a top center of said main body, said main body receiving said credit card through said card insert slit;

a slant support block supporting a lower end of said credit card inserted in said card insert slit;

a stopper provided at a lower section of said slant support block, said stopper preventing said credit card from sliding off said support block and guiding said credit card such that said credit card is precisely placed on a predetermined position of said support block;

a slant mounting plate mounted on said slant support block such that it is spaced apart from said support block at a predetermined interval by a spacer;

imprinting roller means for imprinting embossed characters of said credit card on an imprinting blank of said sales slip, said imprinting roller means being mounted on a bottom of said mounting plate and rotatably supported by a roller support bracket such that it is linearly reciprocated together with said roller support bracket;

drive means for reciprocating said imprinting roller means together with said roller support bracket, said drive means comprising a drive motor mounted on said mounting plate, a drive spur gear mounted on the bottom of said mounting plate and coupled to a rotating shaft of said drive motor in order to be rotated by rotational force of said drive motor, a driven spur gear engaged with said drive spur gear, a rack bar engaged with said driven spur gear and mounted on a guide shaft such that it is linearly reciprocated along said guide shaft, and said roller support bracket tightly coupled to said rack bar such that it is linearly reciprocated together with said imprinting roller means when said rack bar is linearly reciprocated by the rotational force of said drive motor;

a printer head for printing other items on their respective blanks of said sales slip after imprinting of said embossed characters on said sales slip; and a sales slip feed sensor mounted on an upper section of said support block in order for checking a feeding operation of said sales slip.

2. The automatic sales slip register according to claim 1, wherein said imprinting roller means has a projection movably received in a longitudinal slot of a roller guide bracket, said roller guide bracket being mounted on the bottom of said mounting plate at a side of said roller support bracket, said projection of the imprinting roller means being linearly reciprocated in said longitudinal slot of the roller guide bracket during movement of said imprinting roller means.

3. The automatic sales slip register according to claim 1, wherein a limit switch is mounted on each side end of said guide shaft in order to control said drive motor such that this motor changes its rotational direction whenever said limit switch comes into contact with said rack bar.

4. The automatic sales slip register according to claim 1, wherein a guide plate is mounted on a lower side of said mounting plate in order for precise introduction of said sales slip between said slant support block and said slant mounting plate.

5. The automatic sales slip register according to claim 1, wherein said imprinting roller means comprises a pair of rollers rotatably mounted on said roller support bracket such that they are spaced out at an interval.

6. The automatic sales slip register according to claim 1, wherein said drive means comprises:

a drive motor mounted on said mounting plate;

a worm coupled to a rotating shaft of said drive motor in order to be rotated by rotational force of said drive motor;

a worm gear engaged with said worm;

a rack bar engaged with said worm gear and mounted on a guide shaft such that it is linearly reciprocated along said guide shaft; and said roller support bracket tightly coupled to said rack bar such that it is linearly reciprocated together with said imprinting roller means when said rack bar is linearly reciprocated by the rotational force of said drive motor.

7. The automatic sales slip register according to claim 1, wherein said drive means comprises:

a drive motor mounted on said mounting plate;

a driven gear mounted on the bottom of said mounting plate and connected to a rotating shaft of said drive motor by a power transmission belt in order to be rotated by rotational force of said drive motor;

a rack bar engaged with said driven gear and mounted on a guide shaft such that it is linearly reciprocated along said guide shaft; and said roller support bracket tightly coupled to said rack bar such that it is linearly reciprocated together with said imprinting roller means when said rack bar is linearly reciprocated by the rotational force of said drive motor.

* * * * *